(12) United States Patent
Tanaka

(10) Patent No.: US 7,172,001 B2
(45) Date of Patent: *Feb. 6, 2007

(54) PNEUMATIC TIRE WITH SHORT FIBERS AND SIPES HAVING ZIGZAG PART AND PRODUCING METHOD THEREOF

(75) Inventor: Susumu Tanaka, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/743,149

(22) Filed: Dec. 23, 2003

(65) Prior Publication Data
US 2004/0134579 A1 Jul. 15, 2004

(30) Foreign Application Priority Data
Dec. 24, 2002 (JP) ............................ 2002-372557

(51) Int. Cl.
B29D 30/52 (2006.01)
B60C 9/12 (2006.01)
B60C 11/00 (2006.01)
B60C 11/12 (2006.01)

(52) U.S. Cl. .............................. 152/209.4; 152/209.18; 152/212; 152/458; 152/DIG. 3; 156/128.1; 264/108

(58) Field of Classification Search ............. 152/209.4, 152/209.18, 209.21, 209.23, DIG. 3, 902, 152/212, 458; 264/108; 156/128.1
See application file for complete search history.

(56) References Cited

U.S. PATENT DOCUMENTS

| | | | |
|---|---|---|---|
| 5,350,001 A * | 9/1994 | Beckmann et al. | 152/DIG. 3 |
| 6,374,885 B1 * | 4/2002 | Uchida et al. | 152/209.4 |
| 6,427,737 B1 * | 8/2002 | Katayama | 152/DIG. 3 |
| 6,564,840 B2 * | 5/2003 | Kleinhoff et al. | 152/DIG. 3 |
| 6,907,910 B2 * | 6/2005 | Iwamura | 152/DIG. 3 |
| 2003/0020197 A1 * | 1/2003 | Sasaki | 264/108 |
| 2003/0029537 A1 * | 2/2003 | Iwamura | 152/209.18 |

FOREIGN PATENT DOCUMENTS

| | | | |
|---|---|---|---|
| EP | 1277599 | * | 1/2003 |
| JP | 4-306106 | * | 10/1992 |
| JP | 2002-168315 A | | 6/2000 |
| JP | 2002-321509 | * | 11/2002 |

* cited by examiner

Primary Examiner—Steven D. Maki
(74) Attorney, Agent, or Firm—Birch, Stewart, Kolasch & Birch, LLP

(57) ABSTRACT

A tread portion has blocks that are provided with a plurality of sipes having a zigzag part. A tread rubber is formed of short fiber mixed rubber comprising 1.5 to 25 parts by weight of short fibers in 100 parts by weight of rubber component. The sipes comprise a three dimensional sipe in which each wall surface forms bumps and dips whereby the short fibers are three dimensionally arranged. The three dimensional sipe comprises the zigzag part extending from the tread face to a certain depth, while (1) gradually moving towards a direction and then the opposite direction thereto or (2) changing the length of the segments of the zigzag.

5 Claims, 10 Drawing Sheets

PNEUMATIC TIRE WITH SHORT FIBERS AND SIPES HAVING ZIGZAG PART AND PRODUCING METHOD THEREOF

This Nonprovisional application claims priority under 35 U.S.C. § 119(a) on Patent Application No(s). 2002-372557 filed in Japan on Dec. 24, 2002, the entire contents of which are hereby incorporated by reference.

TECHNICAL FIELD

The present invention relates to a pneumatic tire which is suitable as a winter tire, and which prevents a reinforcing effect by short fibers from being unbalanced by orienting the short fibers three dimensionally, and which enhances steering stability on a general road while exhibiting excellent on-ice performance. The present invention also relates to a producing method of the pneumatic tire.

DESCRIPTION OF THE RELATED ART

Japanese Patent Application Laid-open No.2000-168315 describes that in order to enhance the on-ice performance of a winter tire, a plurality of sipes are disposed in a tread surface of a tire wherein a tread portion is divided into blocks by tread grooves and short fiber mixed rubber is used as tread rubber.

In this publication, when rubber is cured and formed, tread rubber is pushed between siping blades which form sipes, and this causes the rubber to flow, and short fibers are oriented to the extruding direction, i.e., a thickness direction of the tread utilizing this rubber flow. This enhances the scratching effect of a road surface of the short fibers, and the on-ice performance is largely enhanced by synergism with the edge effect by the sipes.

However, the short fiber mixed rubber has characteristics that the reinforcing effect with respect to the orientation direction of the short fibers is largely deteriorated as compared to reinforcing effect with respect to a direction other than the orientation direction. Therefore, as shown in FIGS. 10(A) and (B), if conventional one dimensional sipes s1 or two dimensional sipes s2 in which a wall surface (a) of the sipes is not varied with respect to the depth direction are formed in the short fiber mixed rubber, the orientation of the short fibers is deviated toward the one dimensional or two dimensional orientation along the wall surface (a) of the sipes. As a result, the block rigidity shows strong directional property and the reinforcing effect is brought into unbalance state, and there is a problem that the steering stability on a general road surface is deteriorated.

Thereupon, based on an idea that three dimensional sipes comprises the zigzag part extending from the tread face to a certain depth, while gradually moving towards a direction and then the opposite direction thereto or changing the length of the segments of the zigzag of the zigzag part, it is an object of the present invention to provide a pneumatic tire being able to arrange short fibers three dimensionally along the wall surface whereby a reinforcing effect is prevented from being unbalanced and steering stability on a general road is enhanced, while exhibiting excellent on-ice performance. It is another object of the invention to provide a producing method of the pneumatic tire.

SUMMARY OF THE INVENTION

To achieve the above object, the present invention provides a pneumatic tire comprising the tread portion divided into blocks by tread grooves, said blocks being provided with a plurality of sipes, each of said sipes opened at the tread face and having the zigzag part, wherein:

a tread rubber of the tread portion is formed of short fiber mixed rubber in which 1.5 to 25 parts by weight of short fibers in 100 parts by weight of rubber component, said sipes comprise a three dimensional sipe in which each wall surface forms bumps and dips whereby said short fibers are three dimensionally arranged, said three dimensional sipe comprises the zigzag part extending from the tread face to a certain depth, while (1) gradually moving towards a direction and then the opposite direction thereto or (2) changing the length of the segments of the zigzag of the zigzag part.

It is preferable that the distance between the center lines of the zigzag part of the adjacent three dimensional sipes is 2.5 to 10.0 mm, and a zigzag pitch Y of the zigzag part is 0.6 to 10.0 times the zigzag amplitude W. Here, the zigzag amplitude W is, as shown in FIG. 3, defined as the peak-to-peak amplitude of the zigzag of the side wall of the sipe. The zigzag pitch Y is the length of one cycle of the zigzag.

It is preferable that the zigzag part extends from the tread face to a certain depth, while gradually moving towards a direction and then the opposite direction to said direction by the displacement amount La whereby the wall surface of the zigzag part is made up of parallelograms.

The present invention also provides a producing method of the pneumatic tire, wherein siping blades each having the shape corresponding to the three dimensional sipes are projected from the inner surface of the curing mold, tread rubber of the raw tire is pushed between the siping blades, thereby orienting short fibers in the tread rubber three dimensionally.

DESCRIPTION OF THE PREFERRED EMBODIMENT

Figure 1:
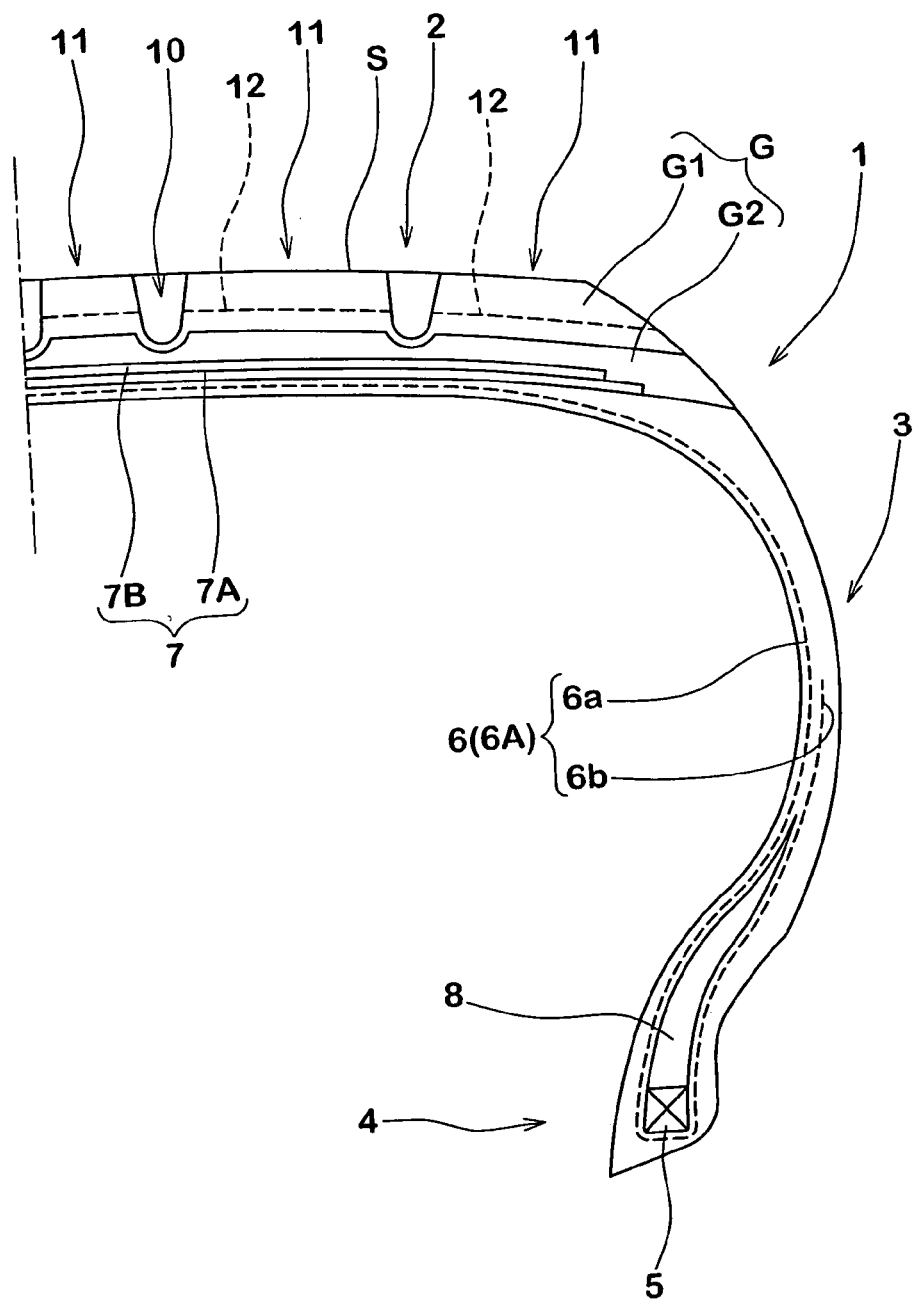
FIG. 1 is a sectional view showing an embodiment of a pneumatic tire of the present invention.
Figure 2:
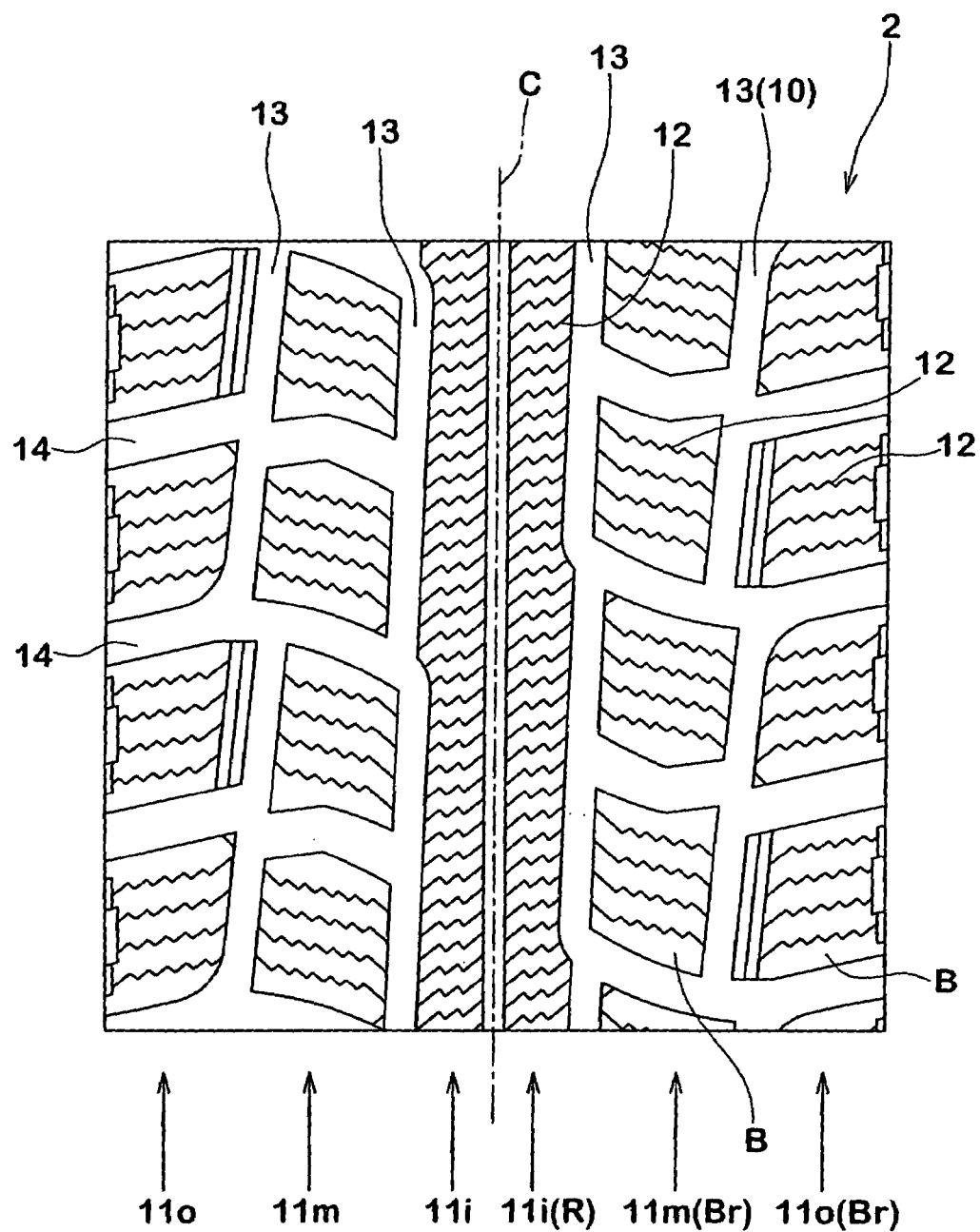
FIG. 2 is a development view showing one example of a tread pattern.

An embodiment of the present invention will be explained below based on the drawings. FIG. 1 is a meridional sectional view when a pneumatic tire of the present invention is formed as a studdless tire for a passenger car. FIG. 2 is a development view of the tread.

In FIG. 1, a pneumatic tire 1 comprises a carcass 6 extending from a tread portion 2 to a bead core 5 of a bead portion 4 through a side wall portion 3, and a belt layer 7 disposed inside the tread portion 2 and outside the carcass 6.

The carcass 6 is formed of at least one, (one in this embodiment) carcass ply 6A in which carcass cords are arranged, for example, at an angle of 70° to 90° with respect to a circumferential direction of the tire. The carcass ply 6A comprises a ply body portion 6a extending between the bead cores 5 and 5, and a turnup portion 6b which is turned up around the bead core 5. A bead apex rubber 8 extending from the bead core 5 radially outward of the tire is provided between the ply body portion 6a and the ply turnup portion 6b. The bead apex rubber 8 reinforces a portion of the tire from the bead portion 4 to the side wall portion 3.

The belt layer 7 is formed of at least two (two in this embodiment) belt plies 7A and 7B in which belt cords are arranged at an angle of 10° to 35° with respect to the circumferential direction of the tire. The belt cords of the belt layer 7 intersect with the plies and thereby the belt layer 7 enhances the rigidity of the belt and the tread portion 2 is strongly reinforced by the hoop effect.

The tread portion 2 is formed with blocks 11 divided by tread grooves 10. A plurality of sipes 12 are arranged side by side in the circumferential direction on the upper surface S (tread surface S, hereinafter) of the blocks 11.

As shown in FIG. 2, in this embodiment, the tread portion 2 is provided with tread grooves 10 which comprise five longitudinal main grooves 13 extending in the circumferential direction of the tire and lateral main grooves 14 intersecting with the longitudinal main grooves 13. With this configuration, the tread portion 2 is divided into inner block rows 11i which are ribs R continuously extending on the opposite sides of a tire equator C in the circumferential direction, intermediate block rows 11m which are blocks B forming block rows on the outer sides of the block lows 11i, and outer block rows 11o which are blocks B forming block rows of opposite outer sides of the block rows 11m. The entire blocks 11 may be formed of the blocks B.

Figure 3:
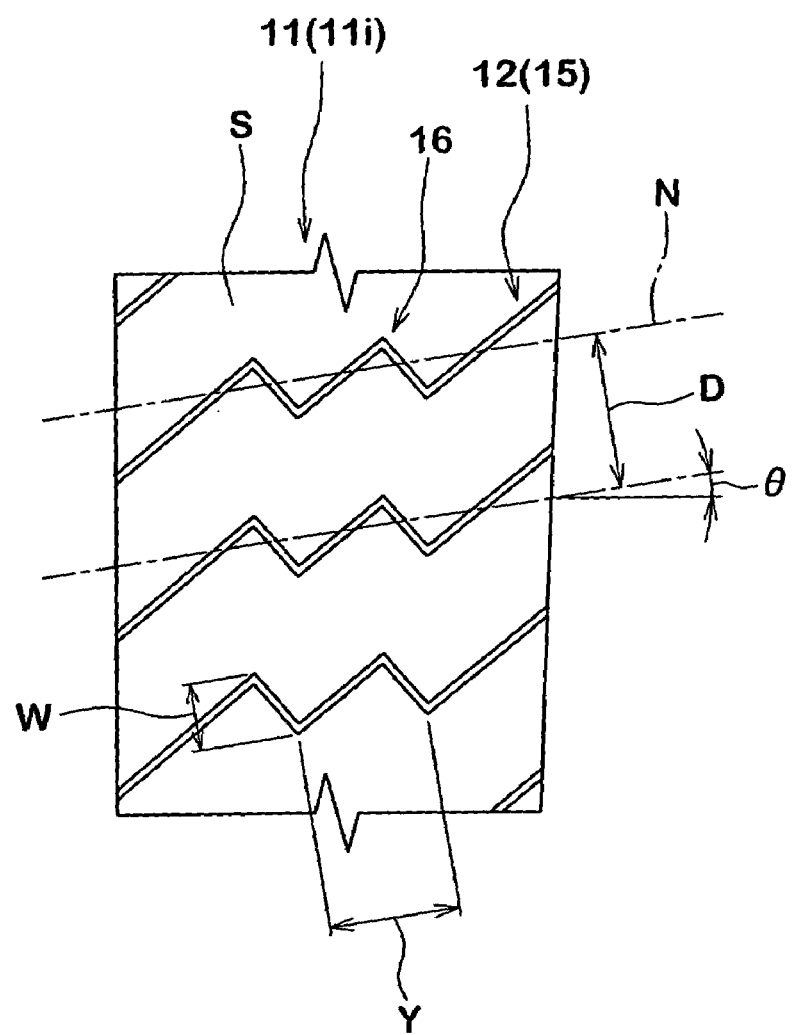
FIG. 3 is a plan view showing a shape of an opening edge of a sipe.

As shown in FIG. 3, each of the sipes 12 is formed with a zigzag part 16 in which an opening edge shape 15 at the tread surface S extends in a zigzag manner in a direction intersecting with the circumferential direction of the tire.

In this embodiment, both ends of the opening edge shape 15 of the sipes 12 are opened at the wall surface in the axial direction of the tire, but only one of the ends may be opened. In this sipes 12, it is preferable that an angle θ of a center line N of the zigzag part with respect to the axial direction of the tire is set to 20° or smaller in view of the on-ice performance.

The opening edge shape 15 is composed of the zigzag part 16 in this embodiment, but a straight line portion which is in parallel to the center line N may be provided in the one or each end of the shape.

Figure 8:
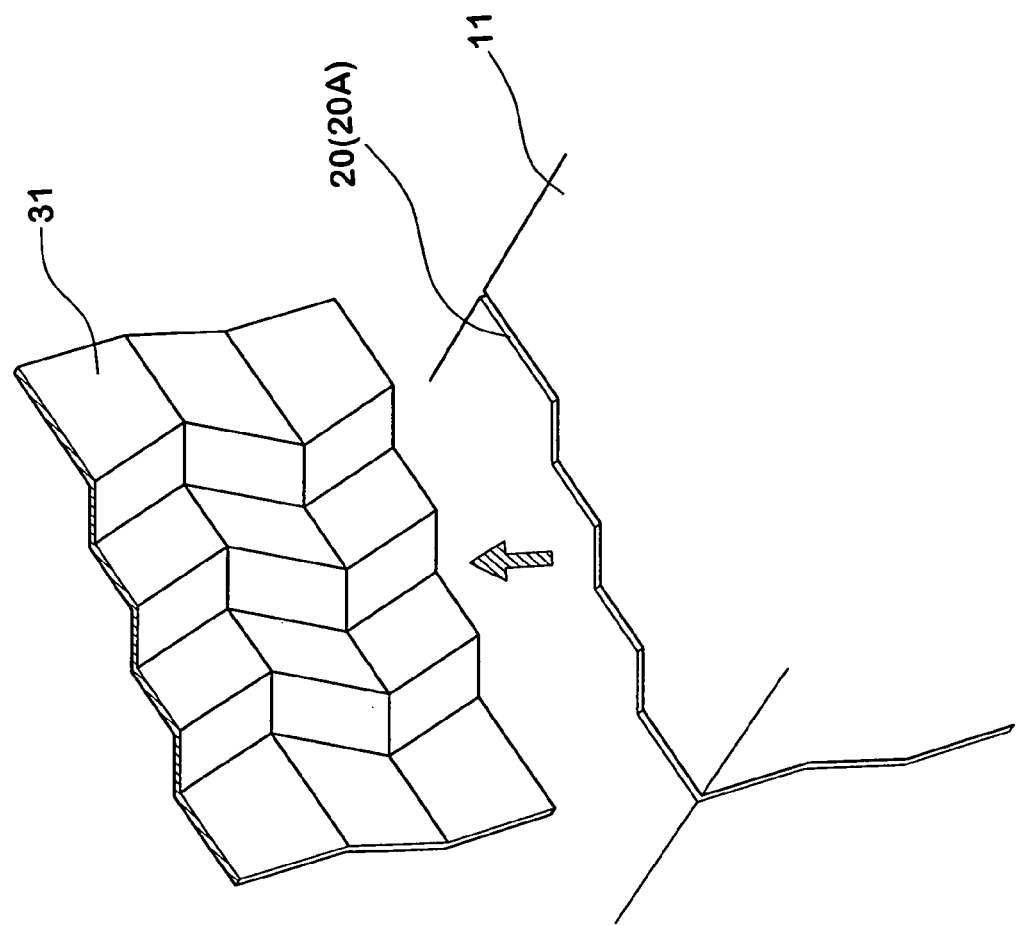
FIG. 8 is a perspective view showing a siping blade.

The zigzag shape of the zigzag part 16 may be formed in a wave line such an arc or a sine curve, other than the V-shaped bent line shown in this embodiment. However, the bent line as in this embodiment is preferably employed in order to ensure high rigidity of the block and high bending rigidity of the siping blade 31 (shown in FIG. 8).

Figure 4:
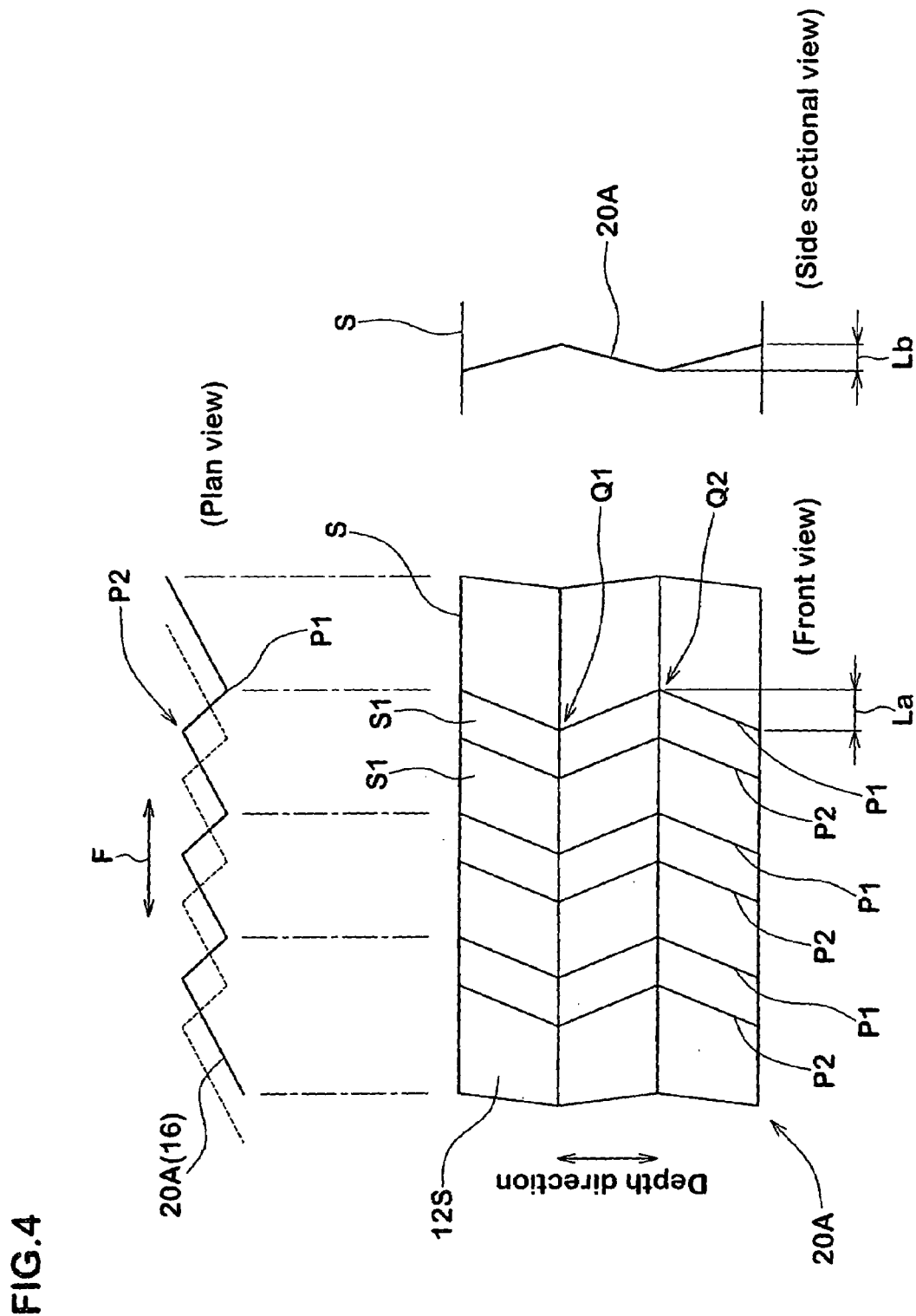
FIG. 4 shows three views (plan view, front view and side sectional view) of one example of three dimensional sipes.
Figure 5:
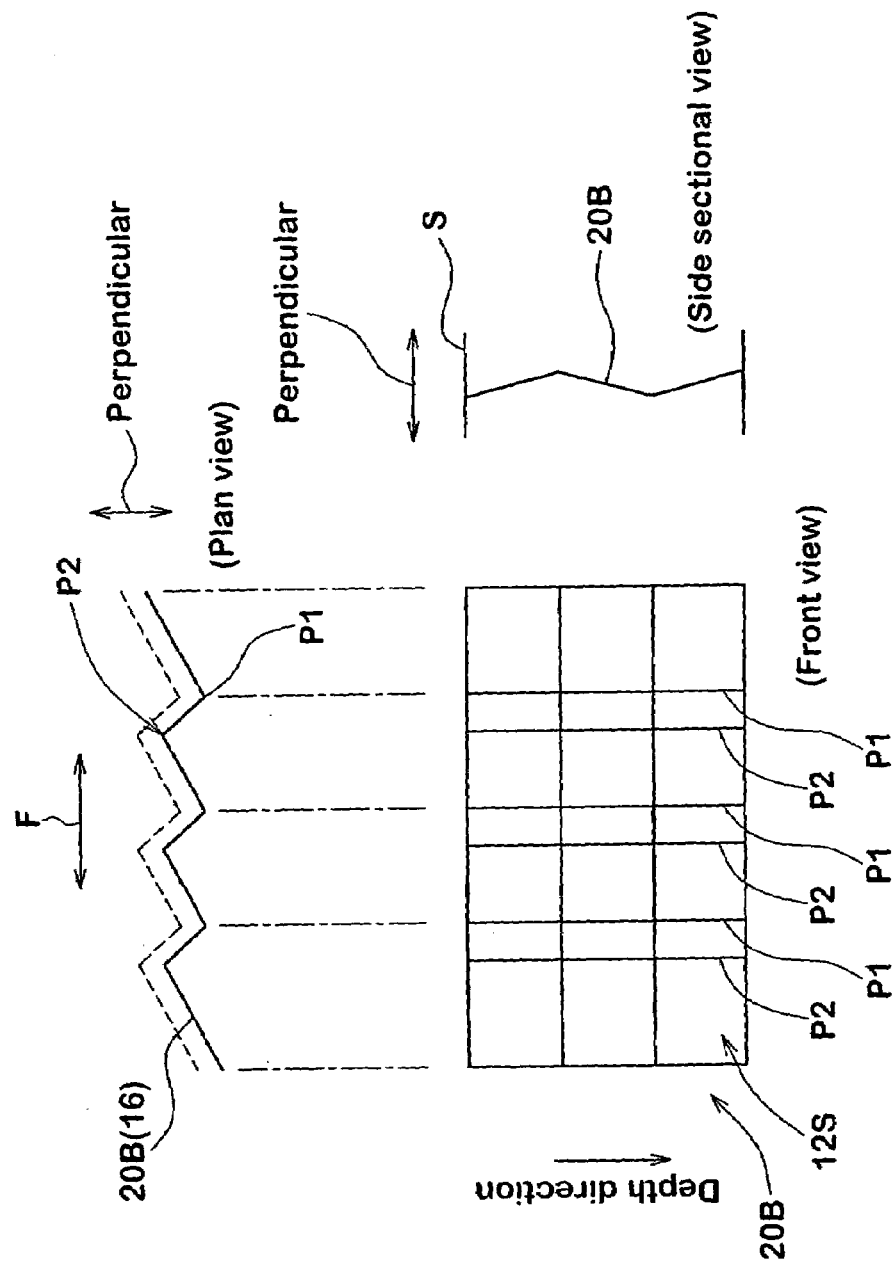
FIG. 5 shows three views (plan view, front view and side sectional view) of another example of three dimensional sipes.
Figure 6:
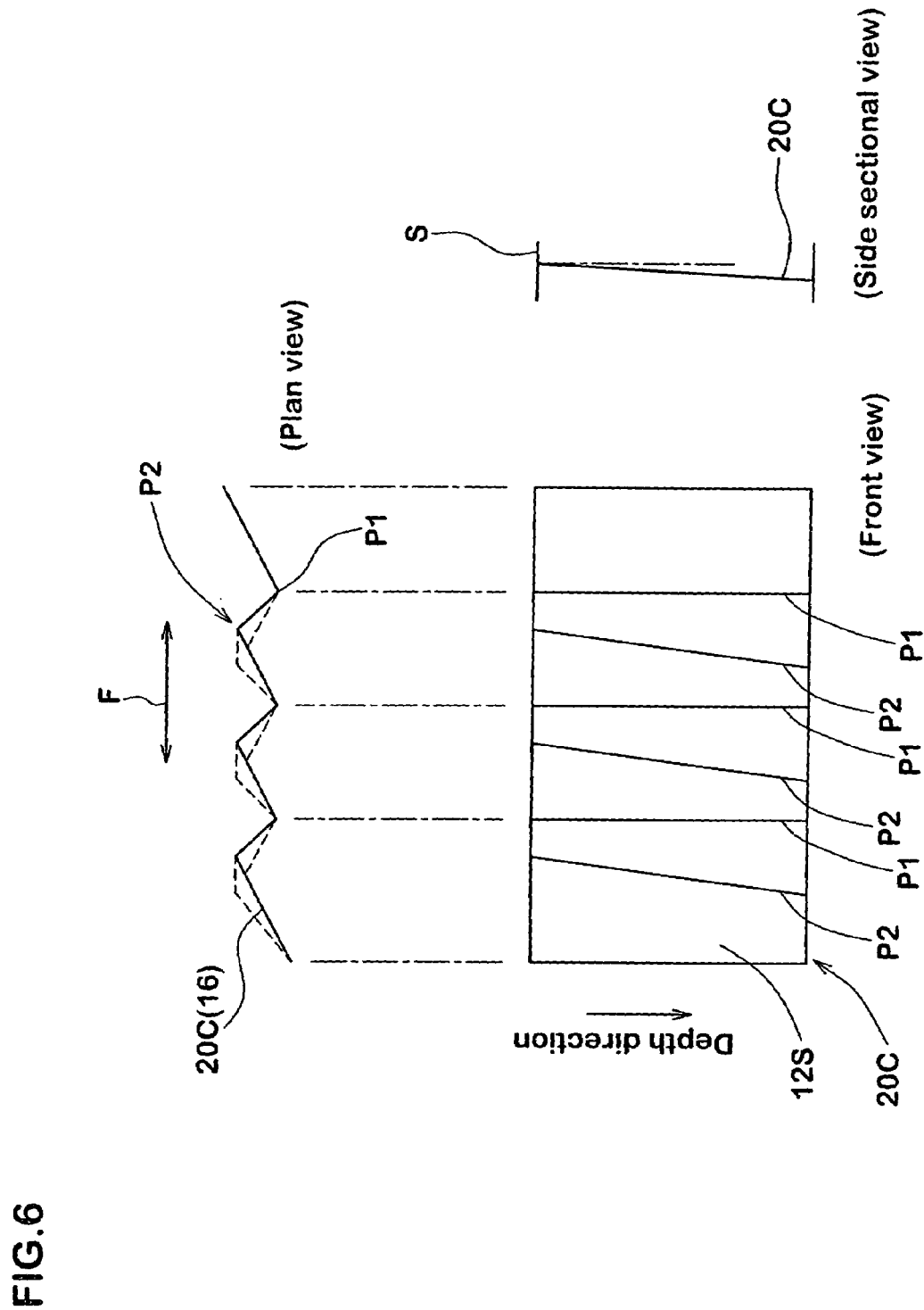
FIG. 6 shows three views (plan view, front view and side sectional view) of another example of three dimensional sipes.

As the sipes 12, it is possible to use three dimensional sipe 20A (FIG. 4) in which the zigzag part 16 moves along one of the directions F of the center line N as it extends from the tread face to a certain depth, three dimensional sipes 20B (FIG. 5) in which the zigzag part 16 moves in a certain direction (e.g., right angle) other than directions. F of the center line N, or three dimensional sipes 20C (FIG. 6) in which the length of the segments of the zigzag of the zigzag part is changed. Each of FIGS. 4 to 6 shows three conceptual views (plan view, front view and side sectional view). In these drawings, reference symbols P1 and P2 represent ridge lines of mountain and valley in the zigzag part 16.

In the three dimensional sipe 20A shown in FIG. 4, the shape of the zigzag part 16 is the same at any depths of the sipe. The sipe 20A is characterized in that the zigzag part moves gradually towards a direction and to the opposite direction thereto as it extends from the tread face to a certain depth.

More specifically, as shown in the front view in FIG. 4, each the ridge line P1, P2 moves towards the one side (left side in FIG. 4) of the direction of the center line as the depth from the tread surface S is increased. Thereafter, the line moves to a first turning point Q1 and is moves towards the other side (right side in FIG. 4) of the center line up to a second turning point Q2. In this manner, the ridge line repeatedly moves to one side and then to the other side in the direction F of the center line successively. Here, the ridge lines P1 and P2 are in parallel to each other from the tread surface S to a bottom of the sipe.

The number of the turning points (Q1, Q2) of the ridge line at which the motion turns is at least 2 (or at least 1.5 cycles), preferably 3 or more (2 or more cycles) in order to obtain sufficient engagement of the side walls for preventing the block from leaning excessively. FIG. 4 shows an example in which the ridge line makes reciprocating motion of 1.5 cycles.

Figure 7:
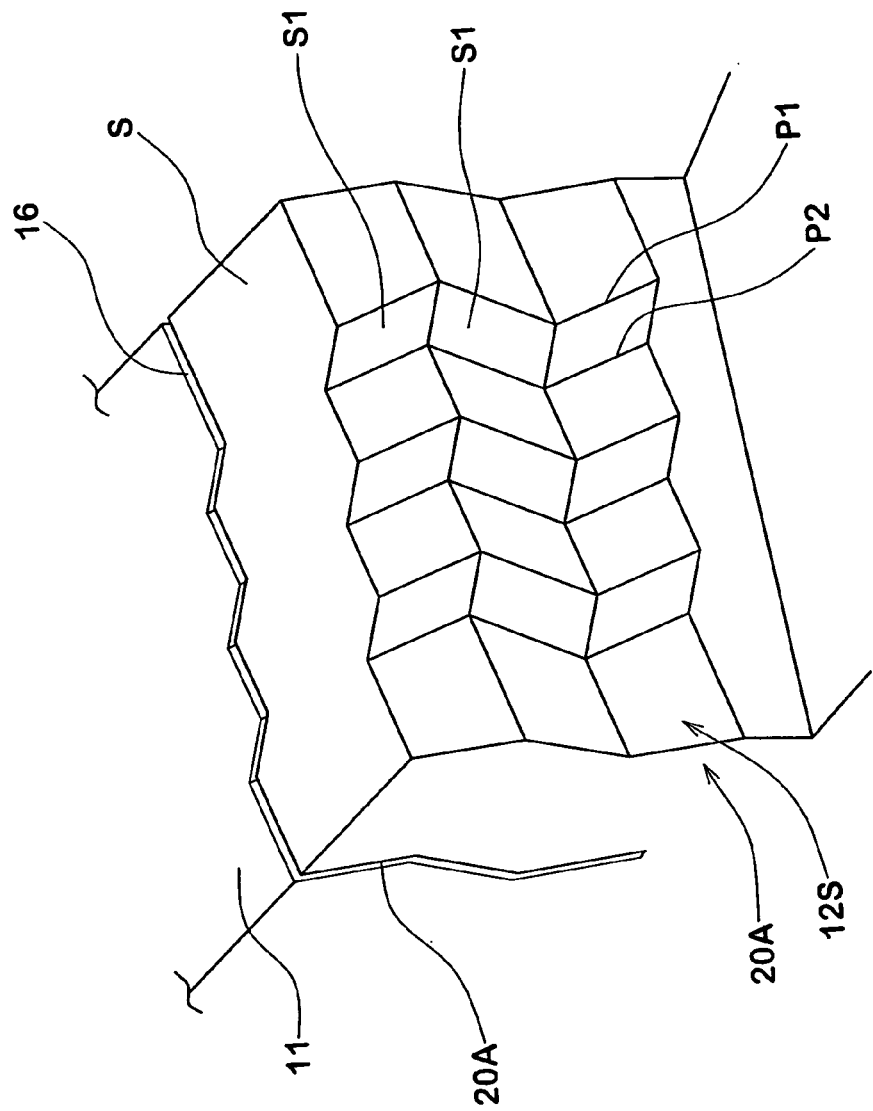
FIG. 7 is a perspective view showing a wall surface of the sipe.

FIG. 7 shows the wall surface 12S of the three dimensional sipe 20A in which a curved surface is formed of a combination of parallelogram surfaces S1 and bumps and dips are repeated three dimensionally. Since the wall surfaces 12S and 12S are engaged to support each other, the block 11 is prevented from leaning. As a result, the reduction of the ground contact area of the tire is controlled so as not to reduce the adhesion friction force, and thereby the tire can improve the edge effect.

Since the shape of the zigzag part is substantially the same at any depths of the sipe, the shape of the three dimensional sipe 20A is always the same on the tread surface S from an initial stage of wearing and a final stage of the wearing. As a result, the block rigidity does not change largely without being affected by development of wear, and thereby the uneven wear can be controlled.

In the three dimensional sipe 20B shown in FIG. 5, like the three dimensional sipe 20A, the shape of zigzag part itself is the same at any depth, but the zigzag part of the sipe 20B moves in a certain direction (e.g., right angle) other than the directions F of center line N. In the three dimensional sipe 20B, like the three dimensional sipe 20A, the wall surface 12S is also formed into a curved surface having three dimensional bumps and dips. Thus, it is possible to effectively prevent the block portion 11 from leaning. Therefore, the reduction of the ground contact area of the tire is controlled so as not to reduce the adhesion friction force, and thereby the tire can improve the edge effect.

In the three dimensional sipe 20B shown in FIG. 5, like the three dimensional sipe 20A, the shape of zigzag part is the same at any depth, The three dimensional sipe 20C shown in FIG. 6 has a feature that the length of the segments of the zigzag part 16 changes as it extends from the tread face to a depth direction. In the three dimensional sipe 20C also, the wall surface 12S is formed as a curved surface having three dimensional bumps and dips and thus, it is possible to effectively prevent the block portion 11 from leaning. However, since variation in the bumps and dips is small as compared to the other three dimensional sipes 20A and 20B, the leaning control effect is smaller. Also, unlike the sipes 20A and 20B, the shape of the sipe 20C changes on the tread surface S as the wears develop and thus, the wear resistance is inferior as compared to sipes 20A and 20B.

According to the present invention, as a tread rubber G which constitutes the tread portion 2, short fiber mixed rubber in which 1.5 to 25 parts by weight of short fibers are mixed in 100 parts by weight of rubber component is used. When the tread rubber G comprises two layers, i.e., a cap rubber layer G1 forming the tread surface S and a radially inner base rubber layer G2, at least the cap rubber layer G1 is formed of the short fiber mixed rubber.

As the rubber component of the short fiber mixed rubber, any one of diene-based rubbers such as natural rubber (NR), styrene-butadiene rubber (SBR), butadiene rubber (BR) and isoprene rubber (IR) may be preferably used, or such rubbers may be used in combination.

As material of the short fibers (f), various organic or inorganic materials such as glass fiber, aluminum whisker, polyester, nylon, Vinylon and aromatic polyamide may be used. Among them, inorganic short fibers (f) having specific gravity of 2.0 or higher such as the glass fiber and aluminum whisker are preferably employed, because the fibers are cut when the rubber is mixed and length thereof can be optimized, and also because the fibers are not softened so much at the curing temperature at the time of curing and forming and the scratching effect of-a road surface is excellent. The average fiber diameter of the short fibers (f) is preferably 30 μm or less and the average length is preferably about 0.3 to 20 mm.

Such a tread rubber G is mixed using a Banbury mixer or a roll and then, formed from tread rubber material which is extruded into a predetermined cross section shape by a calendar roll or a rubber extruder. In a state of the tread rubber material, the short fibers (f) are oriented in the extruding direction (circumferential direction of the tire).

A raw tire made of the tread rubber material is mounted in a curing mold in which the siping blade 31 (shown in FIG. 8) having a shape of the three dimensional sipe 20 and being projected from the inner surface of the mold, and the raw tire is cured and formed according to a normal method.

Figure 9A:
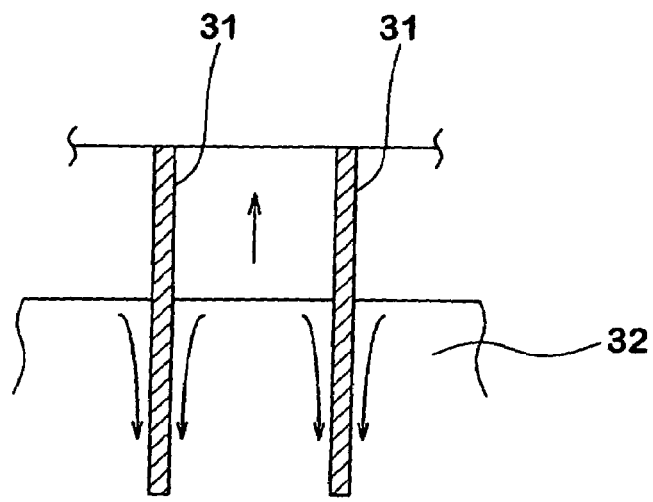
FIG. 9(A) shows flows of rubber pushed by the siping blades.
Figure 9B:
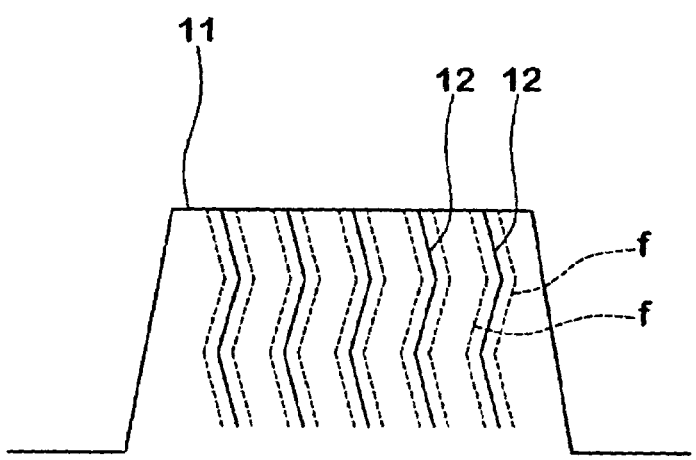
FIG. 9(B) shows three dimensional arrangement of the short fibers made by the rubber flow.

At that time, the raw tire is expanded and the short fiber mixed raw rubber 32 is pushed between the siping blades 31 and 31 as shown in FIG. 9(A), a rubber flow J in the pushing direction is generated in the surface of the siping blades 31, and the short fibers (f) can be oriented three dimensionally along the wall surface 12S as shown in FIG. 9(B).

Since the end surface of the short fiber (f) is exposed in the tread surface S, scratching effect becomes excellent. Further, since the short fibers S are oriented three dimensionally, the unbalance of the reinforcing effect is corrected, and generation of directional property in the rigidity can be controlled. As a result, while the three dimensional sipe 20 itself has an improved rigidity, the block portion 11 is controlled not to lean. Therefore, the tire can exhibit an excellent on-ice performance and can largely improve the steering stability on a general road surface, i.e., the steering stability on wet and dry road surfaces.

In order to orient the short fibers (f) three dimensionally, a distance D (shown in FIG. 3) between the center lines N and N in the adjacent three dimensional sipe 20 is preferably set to 2.5 to 10.0 mm. If the distance D exceeds 10.0 mm, the orientation can not be controlled sufficiently. If the distance D is smaller than 2.5 mm, the influence of reduction of the block rigidity is excessively large, and even when the short fibers (f) are oriented three dimensionally, the effect of the steering stability may not be improved. The distance D is more preferably 3.5 to 7.0 mm.

It is necessary to comprise 1.5 to 25.0 parts by weight of short fibers f in 100 parts by weight of the rubber component as described above. If the amount of the short fibers is smaller than 1.5 parts by weight, the effect of improving the on-ice performance by the scratching effect can not be exhibited. If the amount exceeds 25.0 parts by weight, the wear resistance is reduced. Therefore, it is preferable that the mixing amount of the short fibers (f) is 4.0 to 10.0 parts by weight.

The three dimensional sipes 20A and 20B may preferably be employed as the three dimensional sipe 20, in view of the improvement of the block rigidity, the three dimensional orientation effect of the short fibers (f), and prevention of the uneven wear. The three dimensional sipe 20A is especially preferable, because damages of the siping blades 31, such as deformation and coming off from the mold at the time of removing the vulcanized mold can be prevented.

The reason is that, in the three dimensional sipe 20A, the zigzag part 16 shifts in the direction F of the center line and thus, the displacement amount Lb in the width direction of the sipe can be suppressed to a small value, and thereby the bending stress and bending moment in the thickness direction applied to the siping blades 31 can be reduced.

Since the shape of the zigzag part 16 is the same at any depth, the resistance of removing the tire from the mold is small, and thus, the entire stress applied to the siping blades 31 can be reduced. Since the movement in the direction F of the center line is repeated, stress applied to the siping blade 31 is uniformed. Such damages, like deformation and coming off from the mold, may be prevented due to a combination of these effects.

In the three dimensional sipe 20a, the displacement amount La (shown in FIG. 4) in the directions F of the center line is preferably set in a range of 0.3 to 4.0 mm. If the amount La is smaller than 0.3 mm, the engagement of bumps and dips between the wall surfaces 12S is insufficient, and the prevention of the leaning of the block is insufficient: If the amount La exceeds 4.0 mm on the contrary, the resistance of removing the tire from the mold becomes large, which reduces the productivity. More preferably, the amount La is 0.5 to 2.0 mm.

In the zigzag part 16, the zigzag amplitude W (shown in FIG. 3) is preferably set in a range of 1 to 5 mm, and a pitch Y in the directions F of the center line is preferably set in a range of 0.6 to 10.0 times the width W.

The width W, the pitch Y and the displacement amount La of the three dimensional sipe 20 may be changed for each the ribs R or blocks B if necessary. Blocks having the conventional one dimensional sipes s1 and the two dimensional sipes s2 may be used with the blocks having the three dimensional sipes 20.

Although the preferred embodiment of the present invention is described above, the invention is not limited to the illustrated embodiment, and it is possible to carry out the invention with various modifications.

EXAMPLE

Passenger car tires (size is 175/80R14) having the tread pattern shown in FIG. 2 and sipes in a specification shown in Table 1 were prototyped, on-snow and on-ice performance of the prototyped tires and steering stability on the general road surface were tested and compared.

As the tread rubber, short fiber-mixed rubber comprising glass fiber (average fiber diameter is 33 μm and average length is 0.6 mm) as shown in Table 1 is used.

(1) On-snow and on-ice performance;

The prototyped tires were mounted on all wheels of a passenger car (FR vehicle of 2000 cc), and under the condition that the tires are mounted on a rim with the size of 15×5.5 JJ and an internal pressure of 200 kPa is given, the car was allowed to run on a snow and ice test course, and characteristics such as a steering response, rigidity feeling and grip performance are indicated with indices while a conventional example is designated as 100 by a driver's sensory evaluation. A greater index indicates more excellent result.

(2) Steering stability on general road surface;

The same car was allowed to run on an asphalt dry test course and a wet test course, characteristics such as a steering response, rigidity feeling and grip performance are indicated with indices while a conventional example is designated as 100 by a driver's sensory evaluation. A greater index indicates more excellent result.

TABLE 1

(PS3472)

Figure 10A:
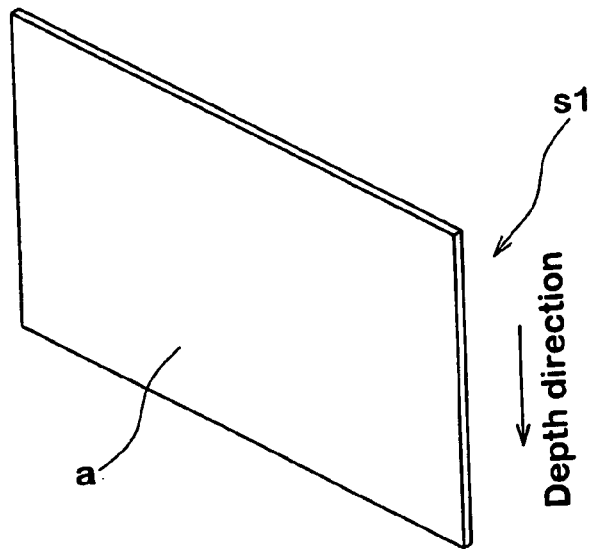
FIG. 10(A) is a perspective view showing a conventional one dimensional sipe.
Figure 10B:
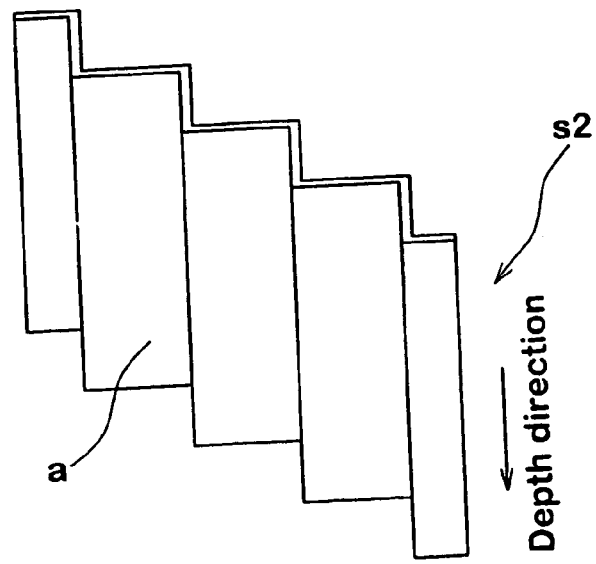
FIG. 10(B) is a perspective view showing another conventional two dimensional sipe.

| | Conventional Example | Comparative Example 1 | Comparative Example 2 | Comparative Example 3 | Example 1 | Example 2 |
|---|---|---|---|---|---|---|
| Sipeing | | | | | | |
| Distance D between center lines | | | | | | |
| (Inner block rows) | (3.8 mm) | (3.8 mm) | (3.8 mm) | (3.8 mm) | (3.8 mm) | (3.8 mm) |
| (Intermediate and outer block rows) | (4.8 mm) | (4.8 mm) | (4.8 mm) | (4.8 mm) | (4.8 mm) | (4.8 mm) |
| Width W | 1.5 mm | 1.5 mm | 1.5 mm | 1.5 mm | 1.5 mm | 1.5 mm |
| Pitch Y | 3.5 mm | 3.5 mm | 3.5 mm | 3.5 mm | 3.5 mm | 3.5 mm |
| Sipeing wall surface | Two dimension (FIG. 10B) | Two dimension (FIG. 10B) | Two dimension (FIG. 10B) | Three dimension (FIG. 4) | Three dimension (FIG. 4) | Three dimension (FIG. 4) |
| Mixing amount of short fibers | 4.5 | 1 | 1 5 | 1 | 4.5 | 1 5 |
| On-snow and on-ice performance | 100 | 100 | 95 | 105 | 115 | 105 |
| Steering stability | | | | | | |
| Dry road | 100 | 100 | 95 | 105 | 120 | 105 |
| Wet road | 100 | 90 | 105 | 95 | 120 | 115 |

Since the present invention has the above-described structure, it is possible to orient the short fibers three dimensionally along the wall surface of the sipe, to correct the unbalance of the reinforcing effect, and to prevent the block rigidity from having directional property. As a result, together with the rigidity enhancing effect of the three dimensional sipe itself, it is possible to further prevent the block portion from leaning. Therefore, it is possible to exhibit the on-ice performance and to largely enhance the steering stability on general roads, such as wet or dry roads.

What is claimed is:

1. A pneumatic tire comprising a tread portion divided into blocks by tread grooves, said blocks being provided with a plurality of sipes, each of said sipes opened at a tread face and having a configuration on the tread face comprising a zigzag part and two straight line portions being parallel with the center line of the zigzag, wherein:

a tread rubber of the tread portion is formed of short fiber mixed rubber comprising 1.5 to 25 parts by weight of short fibers in 100 parts by weight of rubber component, said sipes comprise a three dimensional sipe in which each wall surface forms bumps and dips whereby said short fibers are three dimensionally arranged, the zigzag part oscillating in the longitudinal direction of the sipe in the course from tread face to a certain depth so that said three dimensional sipe has wall surface made up of parallelograms at the zigzag part, and displacement amount (La) of the zigzag part in the longitudinal direction of the sipe is in a range of from 0.5 to 2.0 mm.

2. The pneumatic tire according to claim 1, wherein a distance between the center lines of the zigzag part of the adjacent three dimensional sipes is 2.5 to 10.0 mm.

3. The pneumatic tire according to claim 1, wherein a zigzag amplitude W of the zigzag part is 1 to 5 mm, and a zigzag pitch Y of the zigzag part is 0.6 to 10.0 times the zigzag amplitude W.

4. The pneumatic tire according to claim 1, wherein said parallelograms are equal to each other.

5. A producing method of the pneumatic tire according to claim 1, wherein siping blades each having a shape corresponding to the three dimensional sipe are projected from an inner surface of a curing mold, tread rubber of a raw tire is pushed between the siping blades, thereby orienting short fibers in the tread rubber three dimensionally.

* * * * *